United States Patent [19]
Pansini

[11] 3,747,104
[45] July 17, 1973

[54] SUPERVISORY SYSTEM FOR DETECTION AND LOCATION OF CONTINGENCIES

[75] Inventor: Anthony J. Pansini, Waco, Tex.

[73] Assignee: Long Island Lighting Company, Mineola, N.Y.

[22] Filed: Dec. 13, 1971

[21] Appl. No.: 207,013

Related U.S. Application Data

[63] Continuation-in-part of Ser. No. 821,002, May 1, 1969, abandoned.

[52] U.S. Cl. .................... 343/112 R, 343/113 R
[51] Int. Cl. ............................................. G01s 5/02
[58] Field of Search .............. 340/224; 343/100 CS, 343/112 PT, 113, 6 DF; 325/53

[56] References Cited
UNITED STATES PATENTS

| 3,149,317 | 9/1964 | Brugliera et al. | 340/224 |
| 3,369,235 | 2/1968 | Odams et al. | 343/113 R |
| 2,745,096 | 5/1956 | Jenson | 343/6 DF |
| 2,602,162 | 7/1952 | Kenyon | 343/6 DF |

Primary Examiner—Benjamin A. Borchelt
Assistant Examiner—S. C. Buczinski
Attorney—Nolte & Nolte

[57] ABSTRACT

A plurality of self powered, normally silent alarm transmitters are coupled to respective checking points of a distribution network by means of contingency sensitive switches. A receiver continuously monitors the correlated network section within the transmission range of a number of these transmitters to detect the presence of a signal and cooperates with a location finding means adapted to provide, from the received signal, information about location of the active transmitter in the network.

10 Claims, 2 Drawing Figures

PATENTED JUL 17 1973 3,747,104

INVENTOR
ANTHONY J. PANSINI
BY Nolte & Nolte
ATTORNEYS

SUPERVISORY SYSTEM FOR DETECTION AND LOCATION OF CONTINGENCIES

This application is a continuation-in-part of prior application Ser. No. 821,002, filed May 1, 1969 and now abandoned.

BACKGROUND OF THE INVENTION

The present invention relates, in general, to an alarm supervisory system extending over a large area.

In particular, the present invention relates to remote detection and location of contingencies occurring in the electric power distribution network, as well as in home, commercial and industrial premises.

Advantages deriving from the ability to gain immediate knowledge of certain contingencies in the electric power distribution network accrue to almost all phases of working activity — such as operations, safety, customer service and public relations, to name but a few examples — and the ability is of special value during storms, hurricanes and other major disturbances.

In the past, wireless supervisory control systems have been employed which provide an indication of the occurrence of an event at a remote station by means of transmitters at the remote station continuously transmitting a chain of a binary code which is modifice according to that event, the binary code being decoded at a receiver station.

Another known supervisory and remote control system for complex electric power distribution provides a plurality of functional units located at selected control points of the network, and interconnected with a master station by a coded transmission to supervise metering and control functions in the operation of the distribution system.

One of the disadvantages of such known devices, which are designed for a coded radio intercommunication or bidirectional remote control, resides in the fact that respective functional units at remote control points must perform a number of different functions, such as detecting an event, convert that event into a code, transmitting a coded alarm signal and responding to coded orders from the master station. Since the structure of such multifunctional units is complicated, there is a great possibility of malfunction of the system. Consequently, when many thousands of such units must be distributed over an area of several hundred square miles, there is a resultant large expense for maintenance and additional supervision.

Therefore, the primary object of the present invention is to avoid the above-mentioned shortcomings of prior art systems and to provide a monitoring system for power distribution newworks which is reliable in operation and low in production and maintenance cost.

Another object of the present invention is to continuously monitor and rapidly detect accidental contingencies occurring in the electric power distribution network.

A further object of the present invention is to provide means for pinpointing the location of the detected contingency.

Still another object of the present invention is to provide the instant and continuous knowledge of how the key equipment on the distribution system is functioning.

Furthermore, it is an object of the present invention to reduce operation costs and improve quality of service to the customer in a power distribution system by allocating more accurately numbers and kinds of repair crews to specific local areas where trouble is indicated and thus achieve rapid restoration of service as well as less elapsed time for any of the contingencies.

SUMMARY OF THE INVENTION

In accordance with a primary feature of this invention, an electric energy distribution network having a plurality of checking points, is provided at each of these points with a self powered, inexpensive, and normally silent alarm transmitter. Each transmitter is connected to the network by a contingency sensing switching device which initiates the continuous operation of the transmitter when a contingency occurs. At a remote station suitably located in the transmission range of respective transmitters, an omnidirectional receiver continuously monitors the occurrence of signals and cooperates with a location finding means which is adapted to derive information from the detected signals relating to the location of an active transmitter. These location finding means can provide the information either directly if the signals of individual transmitters differ from one another, or indirectly by means of direction finding devices if the transmitted signals are uniform. In a particularly useful arrangement, both of these location finding techniques may be employed to ensure accurate results.

If only uniform transmitted signals are employed, the receiver initiates operation of an associated direction finding unit for determining the direction of the active transmitter. The information from the direction finding device is retransmitted by a relay link to local headquarters which, in turn, can further report to a division or central headquarters, if desirable. The data from each of the direction finding relay units are subsequently projected on a map of the network or displayed on a radar screen to pinpoint the location of the contingency in the field. An operator can quickly interpret or translate the contingency condition from this information and dispatch the necessary men and euipment to correct the condition.

Further, as the contingency condition or conditions are corrected in the field and the repsective transmitters are reenergized, the operator has immediate knowledge of their restoration to normal.

The individual wireless transmitters are preferably transistorized and operated by a rechargable self contained small battery, or condenser or similar devices connected to the switch so as to permit normally deenergized coperation of the transmitter.

The direction finding relay units can be of any convenient type and configuration, such as radar scanners having fixed or rotating antennae, radio direction finders operating on the phase comparison principle (e.g. having an omnidirectional antenna in a fixed relationship to a number of directional antennae) and coupled through a coding means to the relay link.

The direction finding devices may be installed on a mobile vehicle, such as car or helicopter, and the repair crew may be equipped with auxiliary location finding instruments, such as directional field strength meters and the like. In another variation of the present invention, the direction finding means are in continuous operation, in which case the omnidirectional monitoring receiver may be omitted. The data from the direction finding unit are subsequently retransmitted by means of a relay link to the headquarter station.

Since the coordinates of respective checking points in the monitored area are known, the location of a contingency can be determined by means of a single direction finding device. However, in order to increase accuracy of the interpolation, information from two or more separate direction finding stations can be emeployed.

In the modification of the invention incorporating direction finding radar scanners, the intensity variations of the received signal resulting from the interference of the continuously transmitted radar signals with the signals from the field transmitters can be employed for displaying a brighter trace on the radar screen, indicating the location of the trouble.

In a still further modification of the present invention, the received information from the direction finding means can be processed automatically by a data processing apparatus.

Other objects and features of the present invention will become apparent from the following detailed description considered in connection with the accompanying drawings in which:

FIG. 1 shows schematically the basic arrangement of the contingency locating system according to the present invention with various modifications of the direction finding relay units; and FIG. 2 shows schematically a graphical method of geographically locating an active field unit at a headquarters station.

DESCRIPTION OF PREFERRED EMBODIMENTS

Figure 1:
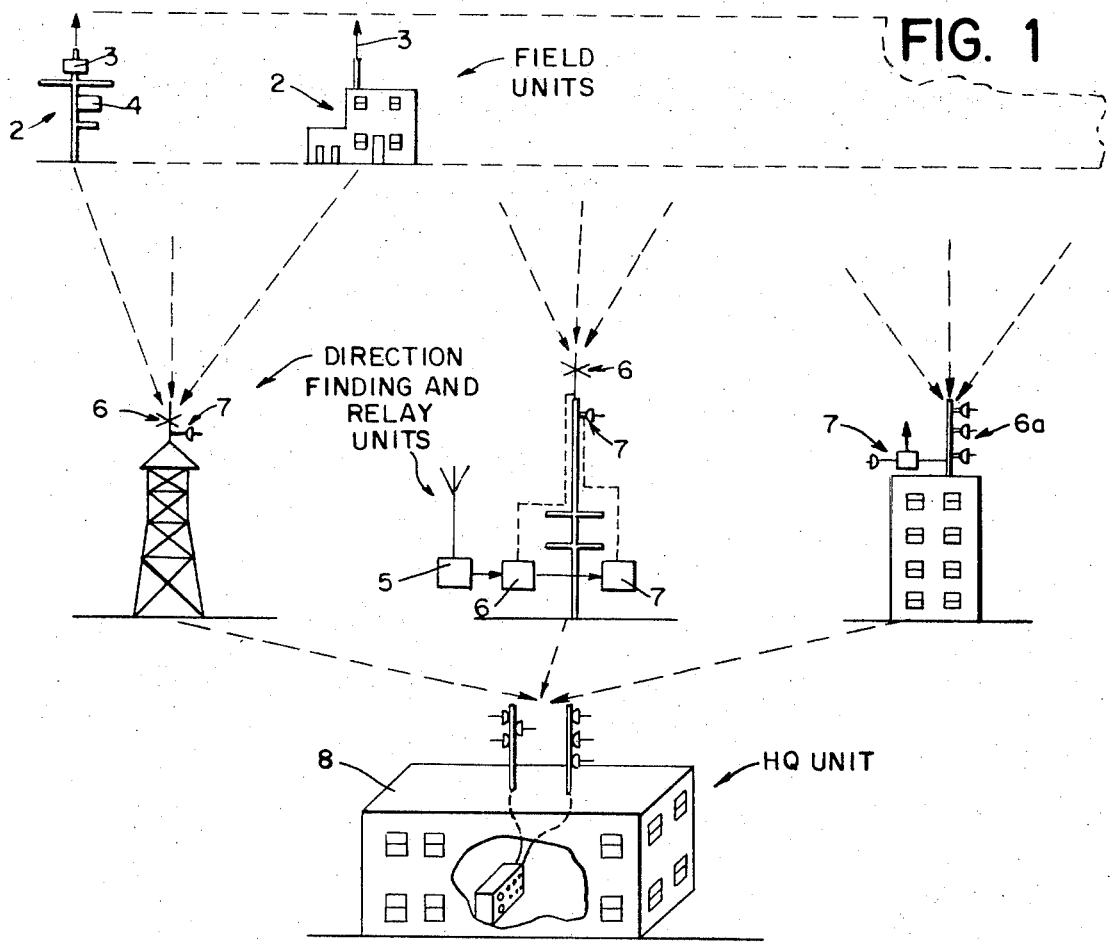
Figure 2:
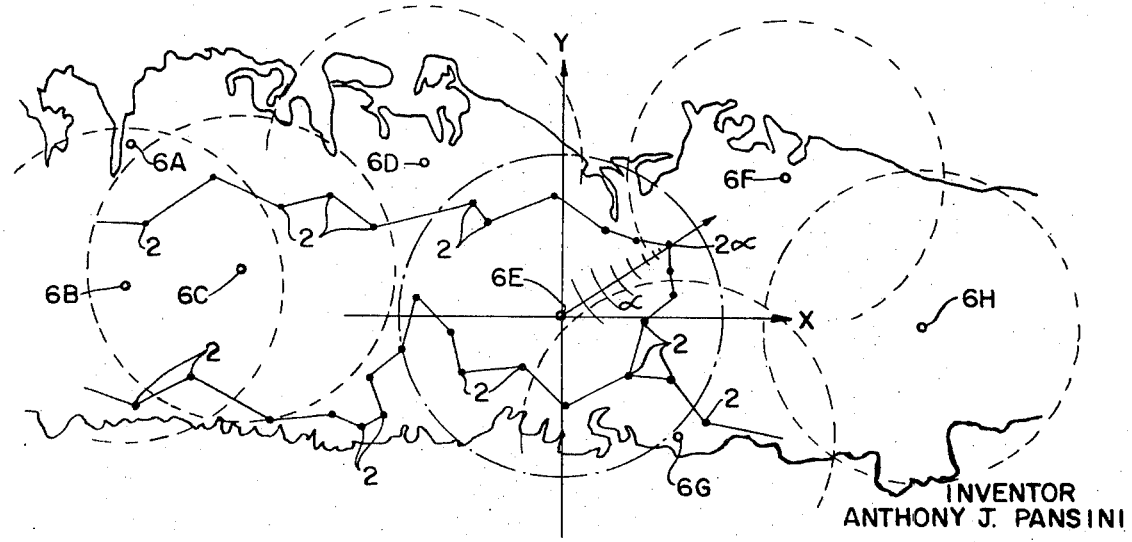

Referring now to the drawing, the electric power distribution network 1 as shown in FIG. 2 is provided at transformer locations or at other checking points in the field with uniform field units 2, each comprising an inexpensive self-powered transmitter 3 which is coupled to the checking point by means of a contingency sensitive switch 4, as schematically illustrated in FIG. 1. At normal conditions of the network 1, the switches 4 keep the respective transmitters 3 silent, but energize them when a contingency occurs. At several suitable locations 6A to 6H adequately mounted direction relay units, each comprising a radio or radar direction finder 6 having stationary or rotating directional antennae, are installed and their signals retransmitted by a directional relay link 7 to a local headquarters station 8. The small transmitters 3 are preferrably transistorized and each of them is equipped with an omnidirectional antenna or with a directional antenna oriented towards the direction finding relay unit.

The direction finding relay unit according to the present invention comprises principally a continuously operating direction finder 6 which can be of any suitable design, such as that having a vertically polarized omnidirectional antenna coupled with two crossed horizontally polarized dipoles to determine direction from the phase differences of the received carrier signal of an active transmitter 3. In another embodiment, the direction finding device can be a radar scanner 6a having a rotatable antenna or an array of antennae respectively oriented in the predetermined directions. The radar scanner can also be adapted to continuously transmit signals at the same frequency as the signals of transmitters and the resulting direction dependent interference signal is retransmitted by a directional relay link 7 to the headquarter unit 8 where it is shown up on the radar screen, indicating the location of the trouble. In other words, the radar scanner can be employed to interrogate the active transmitter at the frequency of the transmitter, to produce an interference signal which brightens the radar screen trace.

The contingency to be monitored in a power distribution network is usually the deenergization of the secondary of the associated transformer. When a portion of a feeder line is affected, all of the tranformers associated with that portion of the line indicate the occurrence of the contingency, and the operator can determine, from the pattern of affected units, the location of the trouble and have some idea of the type of problem, e.g. wire down, fuse blown, etc. Through a simple interconnection of the switch 4 with the red signal light on respective transformers, this scheme can also point up overloaded transformers, and the operation of key switches, capacitor banks, regulators, and other apparatus can be also monitored.

In still another variation of the present invention, the radio or radar direction finder 6 is normally silent whereas an omnidirectional receiver-actuator 5 is in the continuous operation mode to monitor the entire area section of the distribution network. As soon as the reveiver-actuator 5 detects a signal from one of the transmitters 3, the former automatically switches on the function of the associated direction finder 6 and relay link 7. The radio direction finder 6 must be adapted to convert the information about direction of the received signal into a form which is suitable for transmission by the relay link 7. For example, the phase relations of the received radio wave as well as the position of the active finder can be converted into a binary coded message.

In a particularly useful embodiment of the invention, direction finding means are employed in combination with individual transmitters adapted to transmit coded informatin signals. In this embodiment, the direction finding menas can be in the form of either radio or radar direction finding equipment as above described. The direction finding equipment can be either continually operative, in a continuous search mode for detecting active transmitters, or it can be responsive to an omnidirectional search receiver for activation of the direction finding function upon receipt by the omnidirectional equipment of a signal from an active transmitter. While the direction information obtained from the direction locating equipment may be adequate to pinpoint the active transmitter, conditions may arise in which the information is inadequate or inaccurate. For example, there may be disturbance in the reception of signals, or, if a large number of transmitters are necessary in the reception area the resolution of the receiving equipment may not provide the necessary accuracy to pinoint the location of the active transmitter. Similarly, if the transmitters in nearby areas operate at the same frequency, some confusion may arise. While triangulation techniques may overcome this problem, it can also be solved in a very according to the invention by including the signals from the transmitters so that there is nonuniformity in the signals received from the transmitters, thereby providing additional location information.

The transmitters for transmitting in coded signals for this embodiment of the invention may be very simply cnstructed, and hence quite economical. Transister equipment is of course preferred, and the encoding is preferably a simple binary code of, for example, no more than a few bits. In its simplest form, the encoding may be in the form of interruption of the carrier of the transmitter in accordance with the code of the respective transmitter. The transmitters for this purpose employ conventional circuits. While more complex modulation techniques may be employed, it is of course most desirable to provide the simplest and most economical form permissble to enable accurate determination of the code by the receiving equipment. The number of possible codes that are required is of course minimized by the fact that the system also incorporates direction location equipment, so that spaced units in the area covered by a given direction finding means can have the same code.

The mode of location of the contingency is schematically shown in FIG. 2. The entire area of the power distribution network is divided into a number of area sections which correspond substantially with the operational range of respective direction finding devices 6 suitably located and adequately installed at fixed points 6A to 6H. These points constitute origins of coordinate systems X; Y, respectively correlated to each area section so that when a coded message from the direction finder (6E, for example) is received by the headquarters unit 8, the message is decoded and the information about the direction angle $\alpha$ processed in such a manner that the location of a contingency signalling unit 2 $\alpha$ can be determined by calculation or graphically in the coordinate system on a map of the distribution network.

By the use of conventional electric circuitry at the headquarters station data concerning the contingency can be logged on a punched card or stored in a computer. This data can include time contingency started, time end, location, elapsed time, etc. Moreover, with proper auxiliary equipment, crew size, crew arrival, type of contingency, customers affected by the contingency and other pertinent data can be included in the record for later automatic processing of such data.

Obviously, the system according to the present invention or further modifications thereof, can also be applied to the electric transmission system (including substations), to street lighting systems, to the several key elements of the gas transmission and distribution systems, and also to gates, doors, windows and home, commercial and industrial alarm appliances.

What is claimed is:

1. Supervisory system for detection and location of contingencies occurring at predetermined checking points, comprising a plurality of field units respectively connected to said checking points, each of said field units comprising a self powered, normally silent alarm transmitter coupled to the checking point through a contingency sensitive switching means which initiates the oeration of the transmitter when a contingency occurs, at least one receiver means disposed in the transmission range of a number of said field units, said receiver means continuously monitoring said number of field units to detect signals therefrom, and including location finding means responsive to the direction of receipt of said signals for indicating the location of active transmitters in said system.

2. Supervisory system for detection and location of contingencies occurring at predetermined checking points of a power distribution network, comprising a plurality of field units respectively connected to said checking points, each of said field units comprising a self powered, normally silent alarm transmitter coupled to the checking point through a contingency sensitive switch means which initiates oepration of the transmitter when a contingency occurs, a number of direction finding relay units respectively disposed in the transmission range of a group of said field units, and a remote headquarters station, each of said direction finding relay units comprising a direction finder continuously monitoring said number of field units to detect signals therefrom and to provide an angular informaiton signal about the direction of said signals and a relay link adapted to transmit a coded informational signal corresponding to said angular information signal to said remote headquarters station wherein information processing and display means are installed to display the location of active transmitters in said network.

3. The supervisory system according to claim 2 wherein said direction finder is a radar scanner and said information processing means display the location of contingency on a radar screen.

4. The supervisory system according to claim 2 wherein said direction finding relay unit further comprises a continuously operating receiver-actuator for detecting signals from said field units and for actuating a normally silent direction finder when a signal is detected.

5. The supervisory system according to claim 2 wherein said direction finder is a radio direction finder having stationary antenna means.

6. The supervisory system according to claim 5 wherein said radio direction finder is adapted for providing a coded information signal.

7. The supervisory system according to claim 2 wherein said information processing means pinpoint the location of a contingency by calculation from the predetermined positions of respective direction finding relay units and field units.

8. The system of claim 1 wherein the signals transmitted by the transmitters of said field units differ from one another, and said receiver means include means responsive to said signals for dtermining the location of said active transmitters.

9. A supervisory system for an electric power distribution system of the type having a plurality of electric devices to be monitored, said supervisory system comprising a separate normally silent alarm transmitter at each said electric device and coupled thereto by way of contingency sensitive switching means, said switching means being responsive to predetermined malfunctions of the respective electric device for inititating the operation of the respective transmitter, at least one receiver means disposed in the transmission range of a plurality of said alarm transmitters, said receiver means being adapted to continuously monitor said plurality of alarm transmitters to detect signals therefrom, said receiver means further including location finding means responsive to the direction of receipt of signals from said alarm transmitters for indicating the location of active transmitters in the supervisory system.

10. The supervisory system of claim 2 wherein each of said alarm transmitters is adapted to transmit a binary coded signal distinctive of the respective electric device, and said relay units are responsive to said binary coded signals for providing further information regarding the location of said active transmitters.

* * * * *